(12) United States Patent
Tsai

(10) Patent No.: US 11,873,094 B2
(45) Date of Patent: Jan. 16, 2024

(54) HINGE MECHANISMS FOR COUPLING FLIGHT CONTROL MEMBERS TO AIRCRAFT COMPONENTS AND ASSOCIATED METHODS

(71) Applicant: The Boeing Company, Chicago, IL (US)

(72) Inventor: Kevin R. Tsai, Seattle, WA (US)

(73) Assignee: The Boeing Company, Arlington, VA (US)

( * ) Notice: Subject to any disclaimer, the term of this patent is extended or adjusted under 35 U.S.C. 154(b) by 17 days.

(21) Appl. No.: 17/661,588

(22) Filed: May 2, 2022

(65) Prior Publication Data

US 2023/0348040 A1 Nov. 2, 2023

(51) Int. Cl.
*B64C 9/02* (2006.01)
*B64C 9/32* (2006.01)

(52) U.S. Cl.
CPC .............. *B64C 9/02* (2013.01); *B64C 9/323* (2013.01)

(58) Field of Classification Search
CPC ................................... B64C 9/02; B64C 9/323
See application file for complete search history.

(56) References Cited

U.S. PATENT DOCUMENTS

| 8,511,608 B1 * | 8/2013 | Good ................... B64C 9/16 244/99.3 |
| 10,538,303 B2 | 1/2020 | Kijak et al. |
| 10,737,761 B2 | 8/2020 | Tsai |
| 11,097,829 B2 | 8/2021 | Bowers et al. |
| 2009/0146016 A1 * | 6/2009 | Kordel ................. B64C 9/16 244/215 |
| 2011/0135472 A1 | 6/2011 | Cazals et al. |
| 2016/0251074 A1 | 9/2016 | Tsai |
| 2020/0079491 A1 | 3/2020 | Gruner et al. |
| 2020/0180750 A1 | 6/2020 | Tsai et al. |

FOREIGN PATENT DOCUMENTS

GB 734 446 8/1955

OTHER PUBLICATIONS

European Patent Office, Extended European Search Report, App. No. 23158206.5 (dated Sep. 15, 2023).

* cited by examiner

*Primary Examiner* — Brady W Frazier
*Assistant Examiner* — Shanna Danielle Glover
(74) *Attorney, Agent, or Firm* — Walters & Wasylyna LLC

(57) ABSTRACT

A hinge mechanism for hingedly coupling a flight control member having a top surface to an aircraft component having a top surface includes a first hinge member pivotably coupled to the flight control member about a first axis and slidingly coupled to the aircraft component and a second hinge member pivotably coupled to the aircraft component about a second axis and slidingly coupled to the flight control member. The first hinge member is pivotably coupled to the second hinge member about a central axis. The first hinge member and the second hinge member are configured to cooperatively facilitate movement the flight control member relative to the aircraft component between at least a stowed position and a deployed position.

20 Claims, 7 Drawing Sheets

HINGE MECHANISMS FOR COUPLING FLIGHT CONTROL MEMBERS TO AIRCRAFT COMPONENTS AND ASSOCIATED METHODS

FIELD

The present disclosure is generally related to hinge mechanisms and, more specifically, to hinge mechanisms for hingedly coupling flight control members to aircraft components and associated methods.

BACKGROUND

Aircraft components, such as aircraft wings, include members that are movable between at least two positions to facilitate aerodynamic properties, such as flight control surfaces. In order to facilitate movement of the flight control surfaces between stowed and deployed positions, aircraft wings typically have cut-out or removed portions for the flight control surfaces and associated hinges to nest in the wing in the stowed position. Drawbacks to these cut-out designs include high speed drag.

Accordingly, those skilled in the art continue research and development in the field of hingedly coupling flight control members to aircraft components and associated methods thereof.

SUMMARY

Disclosed are hinge mechanisms for hingedly coupling a flight control member having a top surface to an aircraft component having a top surface.

In an example, the hinge mechanism includes a first hinge member pivotably coupled to the flight control member about a first axis $A_1$ and slidingly coupled to the aircraft component and a second hinge member pivotably coupled to the aircraft component about a second axis and slidingly coupled to the flight control member. The first hinge member is pivotably coupled to the second hinge member about a central axis. The first hinge member and the second hinge member are configured to cooperatively facilitate movement the flight control member relative to the aircraft component between at least a stowed position and a deployed position.

Also disclosed are aircraft including the hinge mechanism for coupling a flight control member to an aircraft component.

In an example, the aircraft includes an aircraft component, a flight control member having a top surface hingedly coupled to and movable relative to the aircraft component having a top surface, and a hinge mechanism coupled to the aircraft component and the flight control member. The hinge mechanism includes a first hinge member pivotably coupled to the flight control member about a first axis and slidingly coupled to the aircraft component and a second hinge member pivotably coupled to the aircraft component about a second axis and slidingly coupled to the flight control member. The first hinge member is pivotably coupled to the second hinge member about a central axis. The first hinge member and the second hinge member are configured to cooperatively facilitate movement the flight control member relative to the aircraft component between at least a stowed position and a deployed position.

Also disclosed are methods for actuating a flight control member having a top surface relative to an aircraft component having a top surface between at least a stowed position to a deployed position with an actuator.

In an example, the method includes coupling a hinge mechanism to the flight control member, coupling the hinge mechanism to the aircraft component, and actuating the hinge mechanism between at least the stowed position and the deployed position. The hinge mechanism includes a first hinge member pivotably coupled to the flight control member about a first axis and slidingly coupled to the aircraft component and a second hinge member pivotably coupled to the aircraft component about a second axis and slidingly coupled to the flight control member. The first hinge member is pivotably coupled to the second hinge member about a central axis. The first hinge member and the second hinge member are configured to cooperatively facilitate movement the flight control member relative to the aircraft component between at least a stowed position and a deployed position.

Other examples of the disclosed hinge mechanisms, aircraft, and methods will become apparent from the following detailed description, the accompanying drawings, and the appended claims.

DETAILED DESCRIPTION

Figure 1:
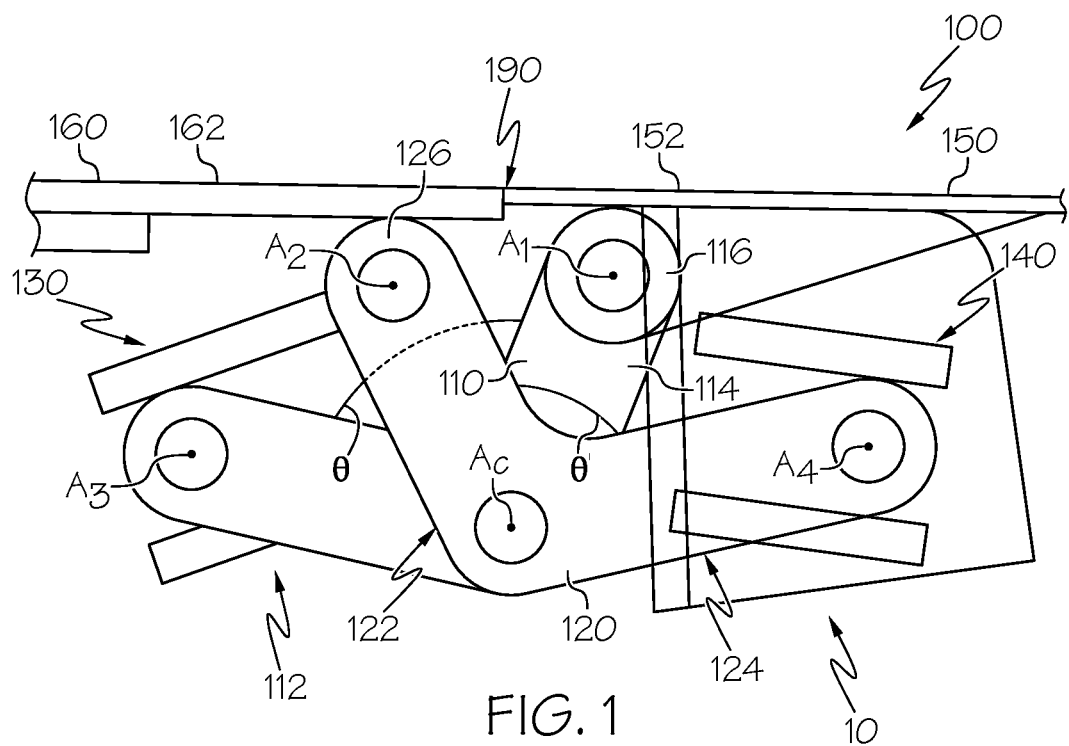
FIG. 1 is a side schematic of a hinge mechanism in a stowed position.

The following detailed description refers to the accompanying drawings, which illustrate specific examples described by the present disclosure. Other examples having different structures and operations do not depart from the scope of the present disclosure. Like reference numerals may refer to the same feature, element, or component in the different drawings.

Illustrative, non-exhaustive examples, which may be, but are not necessarily, claimed, of the subject matter according to the present disclosure are provided below. Reference herein to "example" means that one or more feature, structure, element, component, characteristic, and/or operational step described in connection with the example is included in at least one aspect, embodiment, and/or implementation of the subject matter according to the present disclosure. Thus, the phrases "an example," "another example," "one or more examples," and similar language throughout the present disclosure may, but do not necessarily, refer to the same example. Further, the subject matter characterizing any one example may, but does not necessarily, include the subject matter characterizing any other example. Moreover, the subject matter characterizing any one example may be, but is not necessarily, combined with the subject matter characterizing any other example.

The disclosed hinge mechanism enables a flight control member, such as a spoiler, to rotate without the creation of cutouts in the upper panel in front of the spoiler. This also enables the panel to be effectively larger when deployed. Current solutions require cutouts for the lug to rotate up and through the panel in front of them. This creates high speed drag. Additionally, the spoiler leading edge typically must be moved aft to prevent the leading edge from rotating into the wing structure in front of it. A mechanism which re-creates the motion of a hinge but with natural gooseneck hinge features. This enables improved integration of a hinged device so that it can perform better. This motion enables the panel to be effectively larger when deployed.

The disclosed hinge mechanism may utilize a 4-bar mechanism (paired crank sliders) that re-creates the motion of a hinge but with natural gooseneck hinge features, adapted for use in aircraft hinges such as for spoilers. 4-bar mechanism concept known and implemented in architecture, home furnishings, etc. Solves issues of leaving gaps for hinges, and enables spoiler panel moved by mechanism to have more complex motion, effectively increasing area when deployed. Adaptable to Krueger flaps and landing gear doors. There are many hinged items on the aircraft that may utilize the disclosed hinge mechanism 100, including but not limited to spoilers, Krueger flaps, gear doors and access panels. Often the integration of the hinge causes integration constraints or other undesirable effects. This disclosed hinge mechanism enables the replication of a hingeline through a 4-bar mechanism which offers a different integration space. This can provide an expanded design space for the trajectory of the hinged item and offer a better integration space.

Referring to FIG. 1, disclosed is a hinge mechanism 100 for hingedly coupling a flight control member 150 to an aircraft component 160. The flight control member 150 has a top surface 152 and may be any aerodynamic surface that is movable relative to the aircraft component 160 between at least a stowed position 10 and a deployed position 20. The flight control member 150 may be a flight control surface. In one example, the flight control member 150 is a spoiler. In another example, the flight control member 150 is an aileron. In yet another example, the flight control member 150 is a Krueger Flap.

In one example, the aircraft component 160 is a wing of an aircraft. In another example, the aircraft component 160 is a horizontal stabilizer of an aircraft. In yet another example, the aircraft component 160 is a rib of a wing spar.

The hinge mechanism 100 includes a first hinge member 110 pivotably coupled to the flight control member 150 about a first axis $A_1$ and slidingly coupled to the aircraft component 160. In one example, the first hinge member 110 is coupled to the flight control member 150 with a first rotating pin joint 116.

The first hinge member 110 and the second hinge member 120 are configured to cooperatively facilitate movement the flight control member 150 relative to the aircraft component 160 between at least a stowed position 10 and a deployed position 20. In one example, the top surface 152 of the flight control member 150 is substantially aligned with the top surface 162 of the aircraft component 160 when the hinge mechanism 100 is in the stowed position 10. In another example, the top surface 152 of the flight control member 150 and the top surface 162 of the aircraft component 160 define an effectively continuous aerodynamic surface 190, FIG. 1 when the hinge mechanism 100 is in the stowed position 10. In yet a further example, the top surface 152 of the flight control member 150 is offset from the top surface 162 of the aircraft component 160 when the hinge mechanism 100 is in the deployed position 20 such that the top surface 152 of the flight control member 150 and the top surface 162 of the aircraft component 160 define an aerodynamic angle $\theta_A$, FIG. 3.

Figure 2:
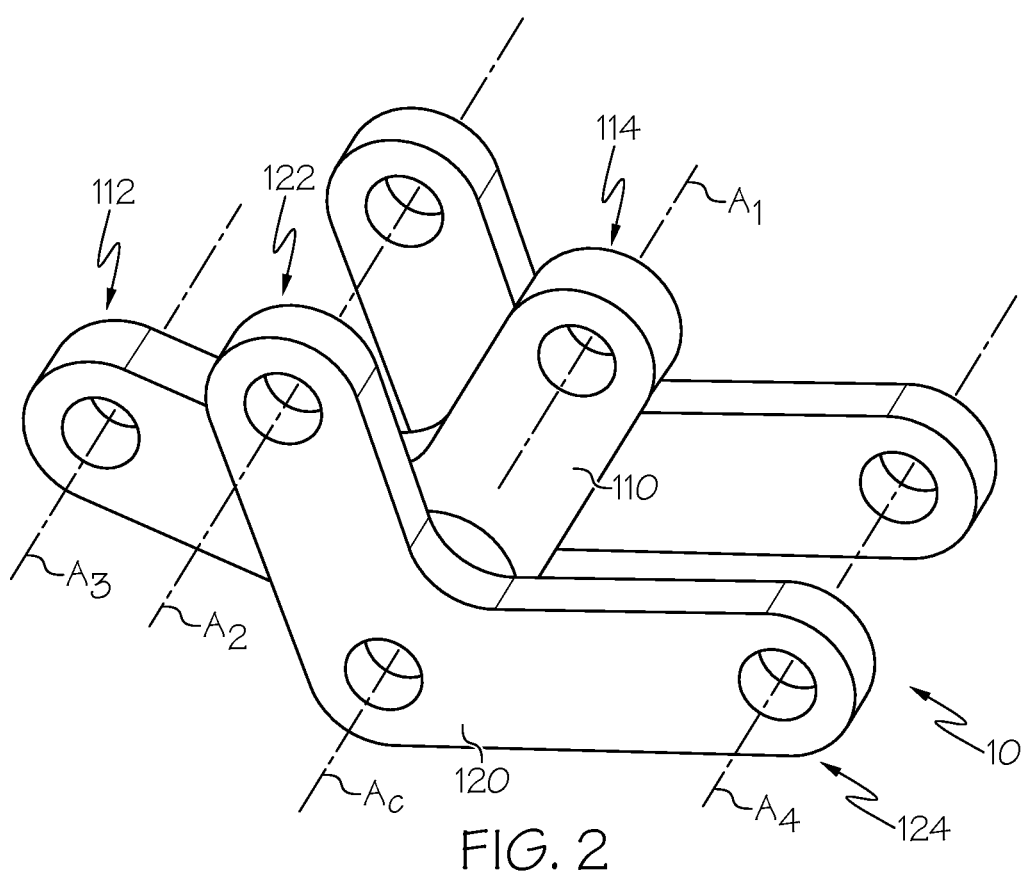
FIG. 2 is a perspective schematic of a portion of the hinge mechanism of FIG. 1.

Referring to FIG. 1 and FIG. 2, in one or more examples, the first hinge member 110 comprises a first extension 112 and a second extension 114 that radially extend from the central axis $A_C$. In one example, the first extension 112 and a second extension 114 define an angle θ. The angle θ may be about 80° to about 120°. In one example, the first hinge member 110 is a single, monolithic structure.

Figure 4:
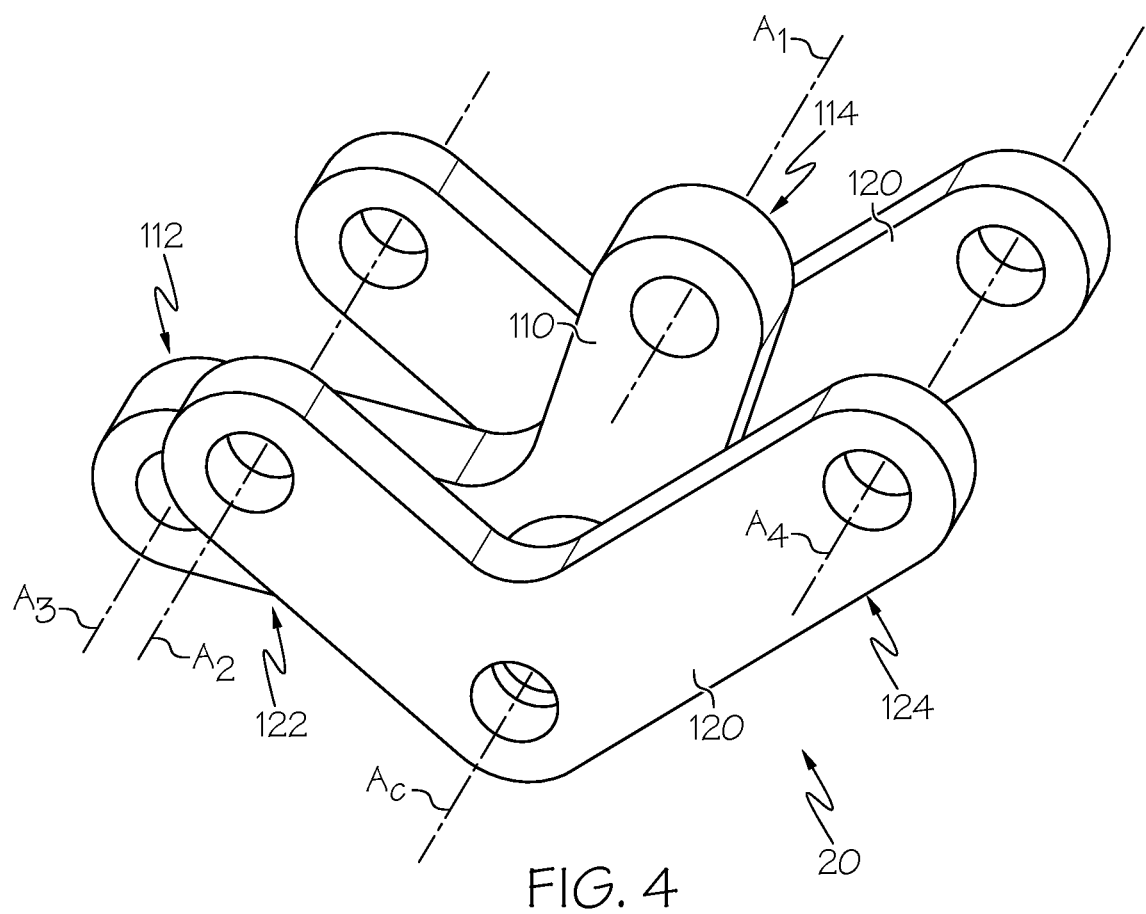
FIG. 4 is a perspective schematic of a portion of the hinge mechanism of FIG. 1 in a deployed position.

Referring to FIG. 1, the hinge mechanism 100 further includes a second hinge member 120 pivotably coupled to the aircraft component 160 about a second axis $A_2$ and slidingly coupled to the flight control member 150. The first hinge member 110 is pivotably coupled to the second hinge member 120 about a central axis $A_C$. In one example, the second hinge member 120 is coupled to the aircraft component 160 with a second rotating pin joint 126. Further, in one or more examples, the first hinge member 110 is pivotably rotatable about a third axis $A_3$. Referring to FIGS. 2 and 4, in one or more examples, the hinge mechanism 100 may include more than one a second hinge member 120 pivotably coupled to the aircraft component 160.

Figure 5:
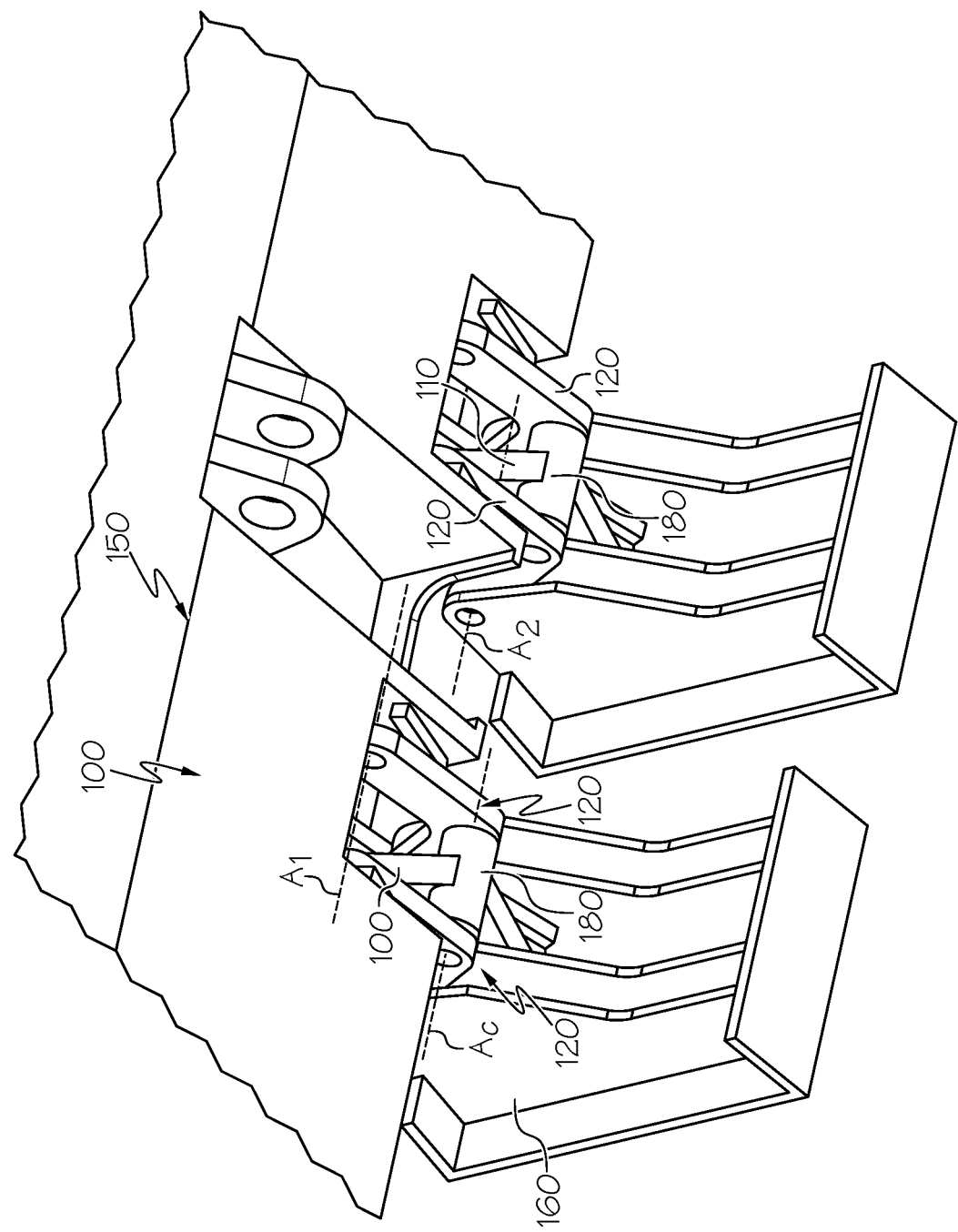
FIG. 5 is a perspective schematic of a portion of an aircraft with the hinge mechanism of FIG. 1.

Referring to FIG. 5, the first hinge member 110 is pivotably coupled to the second hinge member 120 about a central rotating pin joint 180. The central rotating pin joint 180 rotates about the central axis $A_C$.

Referring to FIG. 1, in one or more examples, the second hinge member 120 comprises a second hinge first extension 122 and a second hinge second extension 124 that radially extend from the central axis $A_C$. In one example, the second hinge first extension 122 and the second hinge second extension 124 define a second angle θ'. The second angle θ' may be about 80° to about 120°. In one example, the angle θ of the first hinge member 110 and second angle θ' of the second hinge member 120 are substantially the same. In one example, the second hinge member 120 is a single, monolithic structure.

Referring to FIG. 1, in one or more examples, the hinge mechanism 100 further includes a first sliding track 130 coupled to the aircraft component 160. In one example, the third axis $A_3$ is configured to translate along the first sliding track 130 while the hinge mechanism 100 moves from a stowed position 10, FIG. 1 to a deployed position 20, FIG. 3.

Referring to FIG. 1, in one or more examples, the hinge mechanism 100 further includes a second sliding track 140 coupled to the flight control member 150. In one example, the fourth axis $A_4$ is configured to translate along the second sliding track 140.

Referring to FIG. 1, in one or more examples, the hinge mechanism 100 further includes an actuator 170 coupled to the flight control member 150 and the aircraft component 160. The actuator 170 may be automated such that it automatically actuates based upon a command or may be manually actuated. In one example, the actuator 170 is a pneumatic actuator, a hydraulic actuator, or a linear actuator. The actuator 170 may be mounted to a bottom surface 154 of the flight control member 150.

Figure 8:
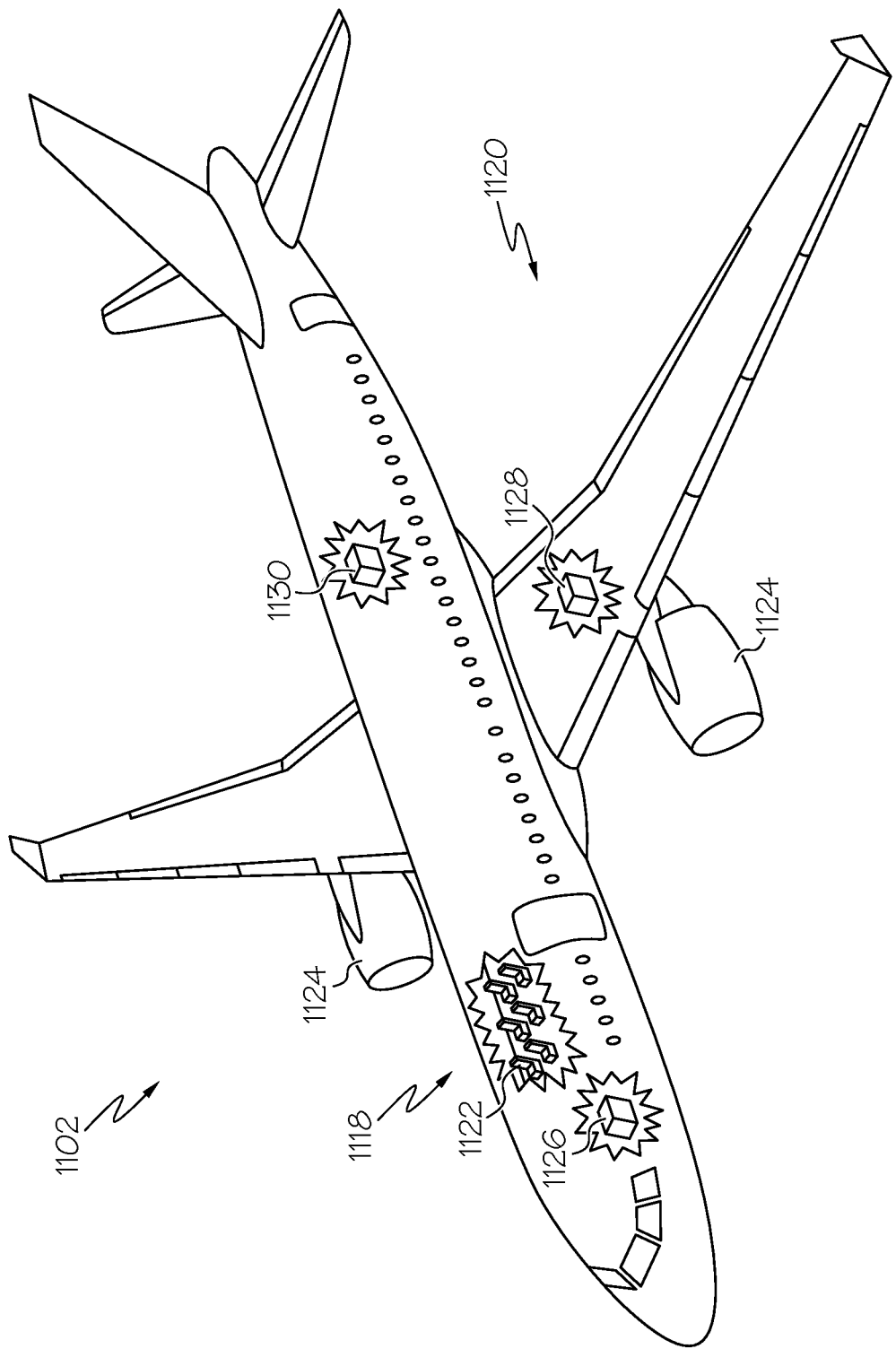
FIG. 8 is a schematic block diagram of an example of an aircraft.

Also disclosed is an aircraft 1102, FIG. 8, comprising the hinge mechanism 100 disclosed herein. In one or more examples, the aircraft 1102 includes an aircraft component 160, a flight control member 150 having a top surface 152 hingedly coupled to and movable relative to the aircraft component 160 having a top surface 162, and a hinge mechanism 100 coupled to the aircraft component 160 and the flight control member 150. The hinge mechanism 100 includes a first hinge member 110 pivotably coupled to the flight control member 150 about a first axis $A_1$ and slidingly coupled to the aircraft component 160 and a second hinge member 120 pivotably coupled to the aircraft component 160 about a second axis $A_2$ and slidingly coupled to the flight control member 150.

The flight control member 150 may be a flight control surface. In one example, the flight control member 150 is a spoiler. In another example, the flight control member 150 is an aileron. In yet another example, the flight control member 150 is a Krueger Flap. In one example, the aircraft component 160 is a wing of an aircraft. In another example, the aircraft component 160 is a horizontal stabilizer of an aircraft. In yet another example, the aircraft component 160 is a rib of a wing spar.

In one or more examples the first hinge member 110 is pivotably coupled to the second hinge member 120 about a central axis $A_C$. Further, the first hinge member 110 and the second hinge member 120 are configured to cooperatively facilitate movement the flight control member 150 relative to the aircraft component 160 between at least a stowed position 10, FIG. 1 and FIG. 2, and a deployed position 20, FIG. 3 and FIG. 4.

The first hinge member 110 and the second hinge member 120 are configured to cooperatively facilitate movement the flight control member 150 relative to the aircraft component 160 between at least a stowed position 10 and a deployed position 20. In one example, the top surface 152 of the flight control member 150 is substantially aligned with the top surface 162 of the aircraft component 160 when the hinge mechanism 100 is in the stowed position 10. In another example, the top surface 152 of the flight control member 150 and the top surface 162 of the aircraft component 160 define an effectively continuous aerodynamic surface 190, FIG. 1, when the hinge mechanism 100 is in the stowed position 10. In yet a further example, the top surface 152 of the flight control member 150 is offset from the top surface 162 of the aircraft component 160 when the hinge mechanism 100 is in the deployed position 20 such that the top surface 152 of the flight control member 150 and the top surface 162 of the aircraft component 160 define an aerodynamic angle $\theta_A$, FIG. 3.

Figure 6:
FIG. 6 is a flow diagram of a method for hingedly coupling a flight control member to an aircraft component.

Referring to FIG. 6, disclosed is a method 200 for actuating a flight control member 150 having a top surface 152 relative to an aircraft component 160 having a top surface 162 between at least a stowed position 10 to a deployed position 20 with an actuator 170. In one example, the actuator 170 is a pneumatic actuator, a hydraulic actuator, or a linear actuator. The actuator 170 may be mounted to a bottom surface 154 of the flight control member 150.

Referring to FIG. 6, the method 200 includes coupling 210 a hinge mechanism 100 to the flight control member 150, coupling 220 the hinge mechanism 100 to the aircraft component 160, and actuating 230 the hinge mechanism 100 between at least the stowed position 10 and the deployed position 20. The coupling 210 and coupling 220 may include mounting the hinge mechanism 100 with any type of mechanical means or mechanical fasteners. In one example, the actuating 230 includes sliding the first hinge member 110 along the first sliding track 130 and sliding the second hinge member 120 along the second sliding track 140.

The hinge mechanism 100 of the method 200 includes a first hinge member 110 pivotably coupled to the flight control member 150 about a first axis $A_1$ and slidingly coupled to the aircraft component 160. In one example, the first hinge member 110 is coupled to the flight control member 150 with a first rotating pin joint 116.

Referring to FIG. 1, in one or more examples, the first hinge member 110 comprises a first extension 112 and a second extension 114 that radially extend from the central axis $A_C$. In one example, the first extension 112 and a second extension 114 define an angle $\theta$. The angle $\theta$ may be about 80° to about 120°. In one example, the first hinge member 110 is a single, monolithic structure.

Referring to FIG. 1, the hinge mechanism 100 of the method 200 further includes a second hinge member 120 pivotably coupled to the aircraft component 160 about a second axis $A_2$ and slidingly coupled to the flight control member 150. The first hinge member 110 is pivotably coupled to the second hinge member 120 about a central axis $A_C$. In one example, the second hinge member 120 is coupled to the aircraft component 160 with a second rotating pin joint 126. Further, in one or more examples, the first hinge member 110 is pivotably rotatable about a third axis $A_3$.

Referring to FIG. 5, the first hinge member 110 is pivotably coupled to the second hinge member 120 about a central rotating pin joint 180. The central rotating pin joint 180 rotates about the central axis $A_C$.

The first hinge member 110 and the second hinge member 120 are configured to cooperatively facilitate movement the flight control member 150 relative to the aircraft component 160 between at least a stowed position 10 and a deployed position 20. In one example, the top surface 152 of the flight control member 150 is substantially aligned with the top surface 162 of the aircraft component 160 when the hinge mechanism 100 is in the stowed position 10. In another example, the top surface 152 of the flight control member 150 and the top surface 162 of the aircraft component 160 define an effectively continuous aerodynamic surface 190, FIG. 1, when the hinge mechanism 100 is in the stowed position 10. In yet a further example, the top surface 152 of the flight control member 150 is offset from the top surface 162 of the aircraft component 160 when the hinge mechanism 100 is in the deployed position 20 such that the top surface 152 of the flight control member 150 and the top surface 162 of the aircraft component 160 define an aerodynamic angle $\theta_A$, FIG. 3.

Figure 3:
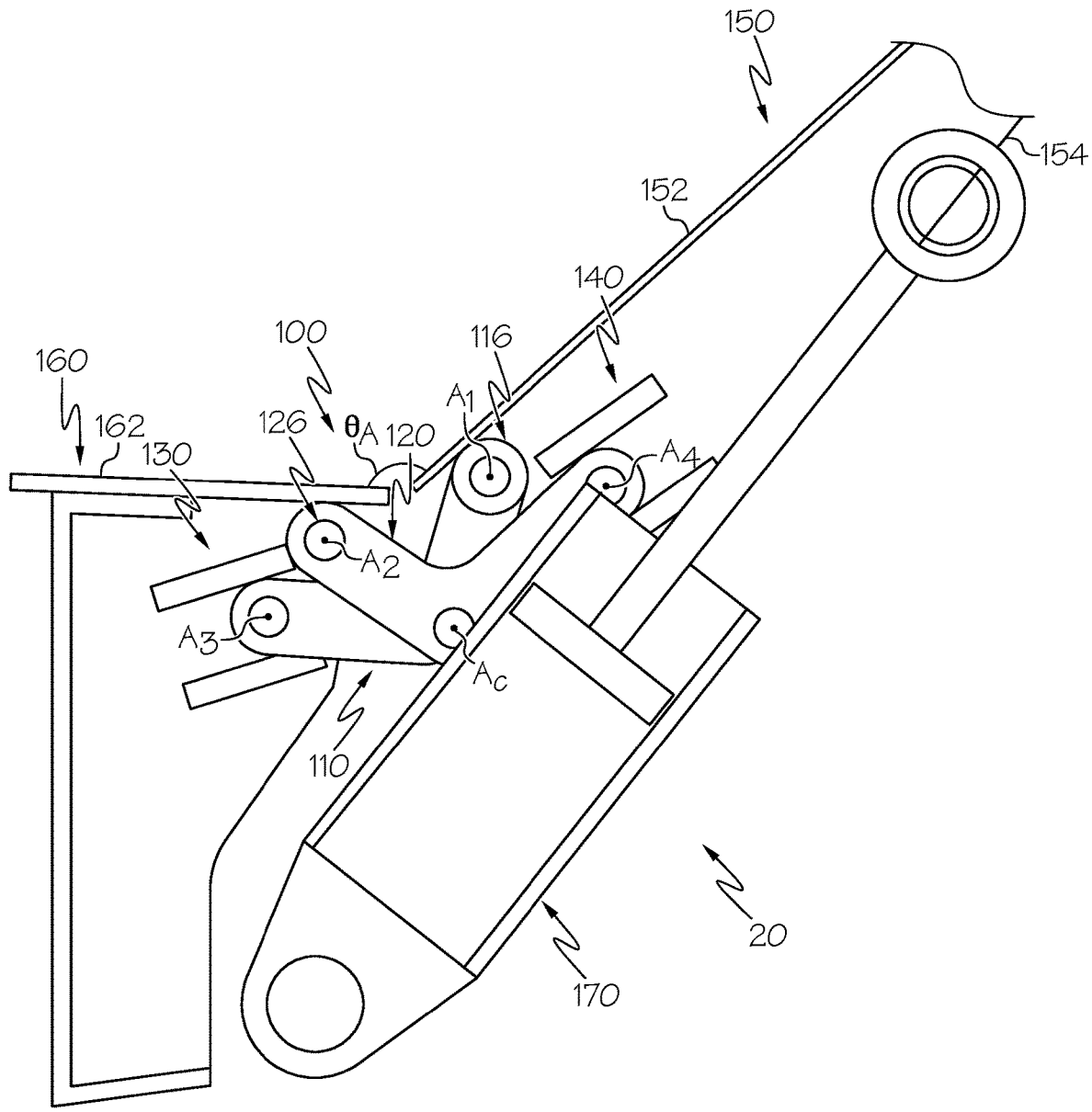
FIG. 3 is a side schematic of the hinge mechanism of FIG. 1 in a deployed position.

Referring to FIG. 3, in one or more examples, the second hinge member 120 comprises a second hinge first extension 122 and a second hinge second extension 124 that radially extend from the central axis $A_C$. In one example, the second hinge first extension 122 and the second hinge second extension 124 define a second angle $\theta'$. The second angle $\theta'$ may be about 80° to about 120°. In one example, the angle $\theta$ of the first hinge member 110 and second angle $\theta'$ of the second hinge member 120 are substantially the same. In one example, the second hinge member 120 is a single, monolithic structure.

Referring to FIG. 1, in one or more examples, the hinge mechanism 100 of the method 200 further includes a first sliding track 130 coupled to the aircraft component 160. In one example, the third axis $A_3$ is configured to translate along the first sliding track 130 while the hinge mechanism 100 moves from a stowed position 10, FIG. 1 to a deployed position 20, FIG. 3.

Referring to FIG. 1, in one or more examples, the hinge mechanism 100 of the method 200 further includes a second sliding track 140 coupled to the flight control member 150. In one example, the fourth axis $A_4$ is configured to translate along the second sliding track 140.

Referring to FIG. 1, in one or more examples, the hinge mechanism 100 of the method 200 further includes an actuator 170 coupled to the flight control member 150 and the aircraft component 160. The actuator 170 may be automated such that it automatically actuates based upon a command or may be manually actuated. In one example, the actuator 170 is a pneumatic actuator.

Figure 7:
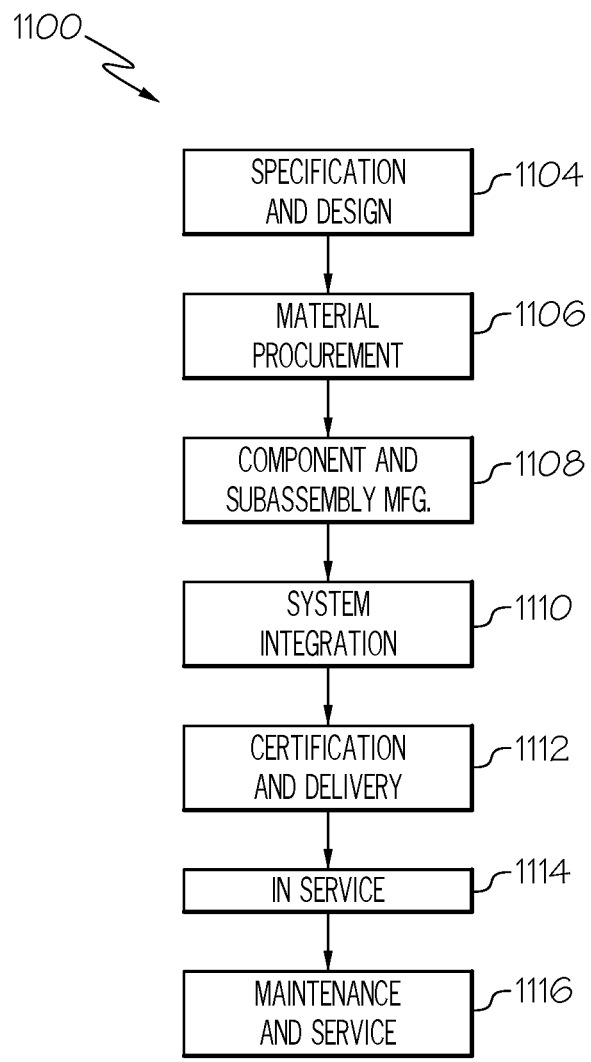
FIG. 7 is a flow diagram of an aircraft manufacturing and service methodology.

Examples of the present disclosure may be described in the context of aircraft manufacturing and service method 1100 as shown in FIG. 7 and aircraft 1102 as shown in FIG. 8. During pre-production, service method 1100 may include specification and design (block 1104) of aircraft 1102 and material procurement (Block 1106). During production, component and subassembly manufacturing (Block 1108) and system integration (Block 1110) of aircraft 1102 may take place. Thereafter, aircraft 1102 may go through certification and delivery (Block 1112) to be placed in service (Block 1114). While in service, aircraft 1102 may be scheduled for routine maintenance and service (Block 1116). Routine maintenance and service may include modification, reconfiguration, refurbishment, etc. of one or more systems of aircraft 1102.

Each of the processes of service method 1100 may be performed or carried out by a system integrator, a third party, and/or an operator (e.g., a customer). For the purposes of this description, a system integrator may include, without limitation, any number of aircraft manufacturers and major-system subcontractors; a third party may include, without limitation, any number of vendors, subcontractors, and suppliers; and an operator may be an airline, leasing company, military entity, service organization, and so on.

As shown in FIG. 8, aircraft 1102 produced by service method 1100 may include airframe 1118 with a plurality of high-level systems 1120 and interior 1122. Examples of high-level systems 1120 include one or more of propulsion system 1124, electrical system 1126, hydraulic system 1128, and environmental system 1130. Any number of other systems may be included. Although an aerospace example is shown, the principles disclosed herein may be applied to other industries, such as the automotive industry. Accordingly, in addition to aircraft 1102, the principles disclosed herein may apply to other vehicles, e.g., land vehicles, marine vehicles, space vehicles, etc.

Hinge mechanism(s), aircraft, and method(s) shown or described herein may be employed during any one or more of the stages of the manufacturing and service method 1100. For example, components or subassemblies corresponding to component and subassembly manufacturing (block 1108) may be fabricated or manufactured in a manner similar to components or subassemblies produced while aircraft 1102 is in service (Block 1114). Also, one or more examples of the hinge mechanism(s), aircraft, and method(s) or combination thereof may be utilized during production stages component and subassembly manufacturing (Block 1108) and system integration (Block 1110), for example, by substantially expediting assembly of or reducing the cost of aircraft 1102. Similarly, one or more examples of the system or method realizations, or a combination thereof, may be utilized, for example and without limitation, while aircraft 1102 is in service (Block 1114) and/or during maintenance and service (Block 1116).

Different examples of the hinge mechanism(s), aircraft, and method(s) disclosed herein include a variety of components, features, and functionalities. It should be understood that the various examples of the hinge mechanism(s), aircraft, and method(s) disclosed herein may include any of the components, features, and functionalities of any of the other examples of the hinge mechanism(s), aircraft, and method(s) disclosed herein in any combination, and all of such possibilities are intended to be within the scope of the present disclosure.

Many modifications of examples set forth herein will come to mind to one skilled in the art to which the present disclosure pertains having the benefit of the teachings presented in the foregoing descriptions and the associated drawings.

Therefore, it is to be understood that the present disclosure is not to be limited to the specific examples illustrated and that modifications and other examples are intended to be included within the scope of the appended claims. Moreover, although the foregoing description and the associated drawings describe examples of the present disclosure in the context of certain illustrative combinations of elements and/or functions, it should be appreciated that different combinations of elements and/or functions may be provided by alternative implementations without departing from the scope of the appended claims. Accordingly, parenthetical reference numerals in the appended claims are presented for illustrative purposes only and are not intended to limit the scope of the claimed subject matter to the specific examples provided in the present disclosure.

What is claimed is:

1. A hinge mechanism for hingedly coupling a flight control member having a top surface to an aircraft component having a top surface, the hinge mechanism comprising:
   a first hinge member pivotably coupled to the flight control member about a first axis and slidingly coupled to the aircraft component; and
   a second hinge member pivotably coupled to the aircraft component about a second axis and slidingly coupled to the flight control member,
   wherein the first hinge member is pivotably coupled to the second hinge member about a central axis,
   wherein the first hinge member comprises a first extension and a second extension that radially extend from the central axis, and
   wherein the first hinge member and the second hinge member are configured to cooperatively facilitate movement of the flight control member relative to the aircraft component between at least a stowed position and a deployed position.

2. The hinge mechanism of claim 1, wherein the top surface of the flight control member is substantially aligned with the top surface of the aircraft component when the hinge mechanism is in the stowed position.

3. The hinge mechanism of claim 1, wherein the top surface of the flight control member and the top surface of the aircraft component define an effectively continuous aerodynamic surface when the hinge mechanism is in the stowed position.

4. The hinge mechanism of claim 1, wherein the top surface of the flight control member is offset from the top surface of the aircraft component when the hinge mechanism is in the deployed position such that the top surface of the flight control member and the top surface of the aircraft component define an aerodynamic angle.

5. The hinge mechanism of claim 1, wherein the first hinge member is coupled to the flight control member with a first rotating pin joint.

6. The hinge mechanism of claim 1, wherein the second hinge member is coupled to the aircraft component with a rotating pin joint.

7. The hinge mechanism of claim 1, wherein the first hinge member is pivotably coupled to the second hinge member about a central rotating pin joint.

8. The hinge mechanism of claim 1, wherein the first extension and the second extension define an angle.

9. The hinge mechanism of claim 8, wherein the angle is about 80° to about 120°.

10. The hinge mechanism of claim 1, wherein the second hinge member comprises a second hinge first extension and a second hinge second extension that radially extend from the central axis, and wherein the second hinge first extension and the second hinge second extension define a second angle.

11. The hinge mechanism of claim 10, wherein the second angle is about 80° to about 120°.

12. The hinge mechanism of claim 1, further comprising a first sliding track coupled to the aircraft component.

13. The hinge mechanism of claim 12, wherein the first hinge member is pivotably rotatable about a third axis and wherein the third axis is configured to translate along the first sliding track.

14. The hinge mechanism of claim 13, further comprising a second sliding track coupled to the flight control member.

15. The hinge mechanism of claim 14, wherein the second hinge member is pivotably rotatable about a fourth axis and wherein the fourth axis is configured to translate along the second sliding track.

16. The hinge mechanism of claim 1, further comprising an actuator coupled to the flight control member and the aircraft component, the actuator being configured to facilitate movement of the flight control member relative to the aircraft component.

17. The hinge mechanism of claim 1, wherein the flight control member is a spoiler.

18. The hinge mechanism of claim 1, wherein the aircraft component is a wing of an aircraft.

19. An aircraft comprising:
   an aircraft component;
   a flight control member having a top surface hingedly coupled to and movable relative to the aircraft component having a top surface; and
   a hinge mechanism coupled to the aircraft component and the flight control member, the hinge mechanism comprising:
      a first hinge member pivotably coupled to the flight control member about a first axis and slidingly coupled to the aircraft component; and
      a second hinge member pivotably coupled to the aircraft component about a second axis and slidingly coupled to the flight control member,
   wherein the first hinge member is pivotably coupled to the second hinge member about a central axis,
   wherein the first hinge member comprises a first extension and a second extension that radially extend from the central axis, and
   wherein the first hinge member and the second hinge member are configured to cooperatively facilitate movement of the flight control member relative to the aircraft component between at least a stowed position and a deployed position.

20. A method for actuating a flight control member having a top surface relative to an aircraft component having a top surface between at least a stowed position to a deployed position with an actuator, the method comprising:
   coupling a hinge mechanism to the flight control member;
   coupling the hinge mechanism to the aircraft component; and
   actuating the hinge mechanism between at least the stowed position and the deployed position, the hinge mechanism comprising:
      a first hinge member pivotably coupled to the flight control member about a first axis and slidingly coupled to the aircraft component;
      a second hinge member pivotably coupled to the aircraft component about a second axis and slidingly coupled to the flight control member;
      a first sliding track coupled to the aircraft component; and
      a second sliding track coupled to the flight control member,
   wherein the first hinge member is pivotably coupled to the second hinge member about a central axis,
   wherein the first hinge member comprises a first extension and a second extension that radially extend from the central axis, and
   wherein the first hinge member and the second hinge member are configured to cooperatively facilitate movement of the flight control member relative to the aircraft component between at least a stowed position and a deployed position.

* * * * *